United States Patent
Sato et al.

(10) Patent No.: US 9,381,907 B2
(45) Date of Patent: Jul. 5, 2016

(54) AMPHIBIOUS VEHICLE

(71) Applicant: MITSUBISHI HEAVY INDUSTRIES, LTD., Tokyo (JP)

(72) Inventors: Shinichi Sato, Tokyo (JP); Takashi Matsunaga, Tokyo (JP)

(73) Assignee: MITSUBISHI HEAVY INDUSTRY, LTD., Tokyo (JP)

( * ) Notice: Subject to any disclaimer, the term of this patent is extended or adjusted under 35 U.S.C. 154(b) by 0 days.

(21) Appl. No.: 14/439,527

(22) PCT Filed: Nov. 8, 2013

(86) PCT No.: PCT/JP2013/080209
§ 371 (c)(1),
(2) Date: Apr. 29, 2015

(87) PCT Pub. No.: WO2014/077193
PCT Pub. Date: May 22, 2014

(65) Prior Publication Data
US 2015/0274150 A1    Oct. 1, 2015

(30) Foreign Application Priority Data

Nov. 15, 2012    (JP) .................................. 2012-251104

(51) Int. Cl.
*B60W 20/00*    (2016.01)
*B60K 6/36*    (2007.10)
(Continued)

(52) U.S. Cl.
CPC .................. *B60W 20/10* (2013.01); *B60F 3/00* (2013.01); *B60F 3/0007* (2013.01); *B60K 6/36* (2013.01);
(Continued)

(58) Field of Classification Search
CPC ... B60W 20/00; B60W 20/10; B60W 20/106; B60W 10/02; B60W 10/06; B60W 10/08; B60W 10/24; B60W 10/26; B60F 3/00; B60F 3/007; B60F 3/0007; B60K 6/36; B60K 6/44; B60K 6/442; B60K 6/46

USPC .................. 180/65.21, 65.225, 65.23, 65.26, 180/65.265, 65.31; 440/12.5, 12.51, 12.57
See application file for complete search history.

(56) References Cited

U.S. PATENT DOCUMENTS

| 7,011,557 | B2 * | 3/2006 | Gibbs | ................... | B60F 3/0007 440/12.51 |
| 7,438,611 | B2 * | 10/2008 | Gibbs | ................... | B60F 3/0007 440/12.5 |

(Continued)

FOREIGN PATENT DOCUMENTS

| JP | 2004-524204 A | 8/2004 |
| JP | 2007-503360 A | 2/2007 |

(Continued)

OTHER PUBLICATIONS

International Preliminary Report on Patentability (Forms PCT/IB/338 and PCT/IB/373), dated May 28, 2015, for International Application No. PCT/JP2013/080209.

(Continued)

*Primary Examiner* — John Walters
(74) *Attorney, Agent, or Firm* — Birch, Stewart, Kolasch & Birch, LLP

(57) ABSTRACT

Provided is an amphibious vehicle such that the deterioration of a fuel economy ratio due to driving at a low load ratio can be suppressed. The amphibious vehicle can travel on land, sea, and waterfront and is provided with: a gas turbine; an electric generator to which output from the gas turbine is transmitted via a first clutch; a water propeller to which the output from the gas turbine is transmitted via a second clutch; a storage battery that is charged with or discharges electric power produced by the electric generator; a motor rotated and driven by electric power supplied from the storage battery; a wheel rotated and driven by rotation and driving of the motor; and a control apparatus that controls the above units. When travelling on land, the control apparatus causes electric power to be supplied from the storage battery to the motor so that a front wheel is rotated and driven by the motor.

10 Claims, 5 Drawing Sheets

(51) Int. Cl.

| | | |
|---|---|---|
| | *B60K 6/442* | (2007.10) |
| | *B60K 6/46* | (2007.10) |
| | *B60F 3/00* | (2006.01) |
| | *B63H 23/30* | (2006.01) |
| | *B60W 10/06* | (2006.01) |
| | *B60W 10/08* | (2006.01) |
| | *B60W 10/26* | (2006.01) |
| | *B60W 10/02* | (2006.01) |
| | *B63H 5/07* | (2006.01) |
| | *B63H 21/20* | (2006.01) |

(52) U.S. Cl.
CPC . *B60K 6/442* (2013.01); *B60K 6/46* (2013.01); *B60W 10/02* (2013.01); *B60W 10/06* (2013.01); *B60W 10/08* (2013.01); *B60W 10/26* (2013.01); *B60W 20/00* (2013.01); *B63H 5/07* (2013.01); *B63H 21/20* (2013.01); *B63H 23/30* (2013.01); *B63H 2021/207* (2013.01); *Y02T 10/6217* (2013.01); *Y02T 70/5236* (2013.01); *Y10S 903/909* (2013.01); *Y10S 903/93* (2013.01); *Y10T 477/26* (2015.01)

(56) References Cited

U.S. PATENT DOCUMENTS 8,454,398 B2 * 6/2013 Jeffery ............... B60F 3/0007
440/12.51
2004/0242090 A1 12/2004 Gibbs

FOREIGN PATENT DOCUMENTS

| JP | 2009-56968 A | 3/2009 |
|---|---|---|
| JP | 2009-67121 A | 4/2009 |
| JP | 2009-67122 A | 4/2009 |
| JP | 2009-67207 A | 4/2009 |
| JP | 2010-269764 A | 12/2010 |
| JP | 2012-171363 A | 9/2012 |
| WO | WO 02/060707 A2 | 8/2002 |

OTHER PUBLICATIONS

International Search Report and Written Opinion of the International Searching Authority (PCT/ISA/237, PCT/ISA/210 and PCT/ISA/220), dated Feb. 10, 2014, for International Application No. PCT/JP2013/080209, with an English translation.

* cited by examiner

AMPHIBIOUS VEHICLE

TECHNICAL FIELD

The present invention relates to an amphibious vehicle.

BACKGROUND ART

The amphibious vehicle is configured so that the vehicle can travel on land by wheels or the like mounted on the amphibious vehicle, the vehicle can sail on water by a propeller mounted on the amphibious vehicle, and the vehicle can travel a waterfront from the water toward the land by both the wheels or the like and the propeller.

CITATION LIST

Patent Literature

[PTL1] PCT Japanese Translation Patent Publication No. 2007-503360
[PTL2] Japanese Unexamined Patent Application Publication No. 2010-269764

SUMMARY OF INVENTION

Technical Problem

Now, as shown in FIG. 4, a gas turbine has characteristics in which weight is lighter, size is smaller, and acceleration performance is superior at the same output compared to a diesel engine. Accordingly, the gas turbine is mainly used for a drive source (engine) of a vessel in which high speed sailing or immediate response is required.

Meanwhile, as shown in FIG. 5, compared to the diesel engine which is generally used as the drive source of the vessel, the gas turbine has characteristics in which a fuel economy ratio deteriorates, and particularly, when a load ratio is 50% or less, has characteristics in which the fuel economy ratio of the gas turbine rapidly deteriorates compared to the fuel economy ratio of the diesel engine.

As shown in FIG. 6, in the amphibious vehicle, since resistance due to water is rapidly increased according to an increase of speed in water sailing, a large output engine as the drive source is required to perform high speed sailing. However, since the resistance in land travelling is smaller than that of the water sailing and the increase in the resistance is smaller even when the speed is increased, a small output engine as the drive source is proper.

In addition, even in a case where a gasoline engine or a diesel engine is used as the drive source, compared to when the engine is driven at a high load ratio, when the engine is driven at a low load ratio, it is known that the fuel economy ratio deteriorates.

Accordingly, engines such as the gasoline engine, the diesel engine, or the gas turbine can be used as the drive source of the amphibious vehicle. However, when the amphibious vehicle having the engine as the drive source travels on land, water, or a waterfront, the fuel economy ratio may deteriorate according to the load ratio.

In addition, in PTL 1 and PTL 2, a propelling (control) system for an amphibious vehicle in which a water mode and a land mode can be switched is described. However, an amphibious vehicle in which deterioration of the fuel economy ratio is suppressed is not described.

Accordingly, the present invention is made to solve the above-described problems, and an object thereof is to provide an amphibious vehicle capable of suppressing deterioration of a fuel economy ratio due to driving at a low load ratio.

Solution to Problem

According to a first invention which solves the above-described problems, there is provided an amphibious vehicle capable of performing land travelling in which the vehicle travels on land, water sailing in which the vehicle sails on water, and waterfront travelling in which the vehicle travels on a waterfront, including: an engine; an electric generator to which output from the engine is transmitted via a first clutch; a storage battery that is charged with or discharges electric power produced by the electric generator; a motor rotated and driven by electric power supplied from the storage battery; a wheel rotated and driven by rotation and driving of the motor; and control means for controlling the engine, the first clutch, the electric generator, the storage battery, and the motor, in which when the vehicle travels on land, the control means causes electric power to be supplied from the storage battery to the motor so that the wheel is rotated and driven by the motor.

According to a second invention which solves the above-described problems, in the amphibious vehicle according to the above-described first invention, water propelling means to which the output from the engine is transmitted via a second clutch; and motor output distribution transmission means for distributing and transmitting the output from the motor to the wheel side and the water propelling means side may be provided, in which the motor output distribution transmission means may include: motor output distribution means for distributing the output from the motor to the wheel side and the water propelling means side; wheel side motor output transmission means for transmitting the output from the motor distributed by the motor output distribution means to the wheel side via a third clutch; and water propelling means side motor output transmission means for transmitting the output from the motor distributed by the motor output distribution means to the water propelling means side via a fourth clutch, in which the control means may also control the second clutch, the third clutch, and the fourth clutch, and in which when the vehicle sails on water at a low speed, the control means may control the second clutch so that the engine and the water propelling means are disconnected from each other, control the fourth clutch so that the water propelling means side motor output transmission means and the water propelling means are connected to each other while controlling the third clutch so that the wheel side motor output transmission means and the wheel are disconnected from each other, and supply the electric power from the storage battery to the motor and drive the water propelling means by the motor.

According to a third invention which solves the above-described problems, in the amphibious vehicle according to the above-described first invention, water propelling means to which the output from the engine is transmitted via a second clutch; and motor output distribution transmission means for distributing and transmitting the output from the motor to the wheel side and the water propelling means side may be provided, in which the motor output distribution transmission means may include: motor output distribution means for distributing the output from the motor to the wheel side and the water propelling means side; wheel side motor output transmission means for transmitting the output from the motor distributed by the motor output distribution means to the wheel side via a third clutch; and a water propelling means side motor output transmission means for transmitting the output from the motor distributed by the motor output distribution means to the water propelling means side via a fourth clutch, the control means also may control the second clutch, the third clutch, and the fourth clutch, and when the vehicle travels on a waterfront, the control means may control the third clutch so that the wheel side motor output transmission means and the wheel are connected to each other while controlling the second clutch so that the engine the water propelling means are disconnected from each other, control the fourth clutch so that the water propelling means side motor output transmission means and the water propelling means are connected to each other, and supply the electric power from the storage battery to the motor and drive the wheel and the water propelling means by the motor.

According to a fourth invention which solves the above-described problems, in the amphibious vehicle according to the above-described first invention, water propelling means to which the output from the engine is transmitted via a second clutch; and storage amount detection means for detecting a storage amount of the storage battery may be provided, in which the control means may also control the second clutch and the water propelling means, and when the vehicle travels on land or sails on water at a low speed, the control means may control the engine so that the engine stops in a case where the storage amount detected by the storage amount detection means is larger than an upper limit set value, and in a case where the storage amount detected by the storage amount detection means is smaller than a lower limit set value, the control means may control the first clutch so that the engine and the electric generator are connected to each other while controlling the second clutch so that the engine and the water propelling means are disconnected from each other, control the engine so that the engine is driven at a high load ratio, and transmit the output from the engine to the electric generator and charge the storage battery with the electric power produced by the electric generator.

According to a fifth invention which solves the above-described problems, in the amphibious vehicle according to the above-described second invention, storage amount detection means for detecting a storage amount of the storage battery may be provided, in which when the vehicle travels on a waterfront, the control means may control the engine so that the engine stops in a case where the storage amount detected by the storage amount detection means is larger than an upper limit set value, and in a case where the storage amount detected by the storage amount detection means is smaller than a lower limit set value, the control means may control the first clutch so that the engine and the electric generator are connected to each other while controlling the second clutch so that the engine and the water propelling means are disconnected from each other, control the engine so that the engine is driven at a high load ratio, and transmit the output from the engine to the electric generator and charge the storage battery with the electric power produced by the electric generator.

According to a sixth invention which solves the above-described problems, in the amphibious vehicle according to the above-described first invention, water propelling means to which the output from the engine is transmitted via a second clutch; and a fifth clutch which performs connection between the engine, and the electric generator and the water propelling means may be provided, in which the control means may also control the second clutch and the fifth clutch, and when an operation which stops the driving of the water propelling means is performed in a case where the vehicle sails on water, the control means may control the fifth clutch so that the engine, and the water propelling means and the electric generator are disconnected from each other, control the first clutch and the second clutch so that the water propelling means and the electric generator are connected to each other, transmit a rotary movement of the water propelling means generated by the water sailing to the electric generator, and charge the storage battery with the electric power produced by the electric generator.

According to a seventh invention which solves the above-described problems, in the amphibious vehicle according to the above-described first invention, the engine may be a gas turbine.

According to an eighth invention which solves the above-described problems, in the amphibious vehicle according to the above-described second invention, the engine may be a gas turbine.

According to a ninth invention which solves the above-described problems, in the amphibious vehicle according to the above-described third invention, the engine may be a gas turbine.

According to a tenth invention which solves the above-described problems, in the amphibious vehicle according to the above-described fourth invention, the engine may be a gas turbine.

According to an eleventh invention which solves the above-described problems, in the amphibious vehicle according to the above-described fifth invention, the engine may be a gas turbine.

According to a twelfth invention which solves the above-described problems, in the amphibious vehicle according to the above-described sixth invention, the engine may be a gas turbine.

Advantageous Effects of Invention

According to an amphibious vehicle of the present invention, without it being necessary to drive an engine at a low load ratio and drive a wheel by the engine, electric power is supplied from a storage battery to a motor and the wheel is rotated and driven by the motor, and the vehicle can travel on land. Accordingly, it is possible to suppress deterioration of a fuel economy ratio due to the driving of the engine at the low load ratio.

DESCRIPTION OF EMBODIMENTS

Embodiments of an amphibious vehicle according to the present invention will be described with reference to the drawings. However, the present invention is not limited to the following embodiments described with reference to the drawings.

First Embodiment

A first embodiment of the amphibious vehicle according to the present invention will be described with reference to FIG. 1.

Figure 1:
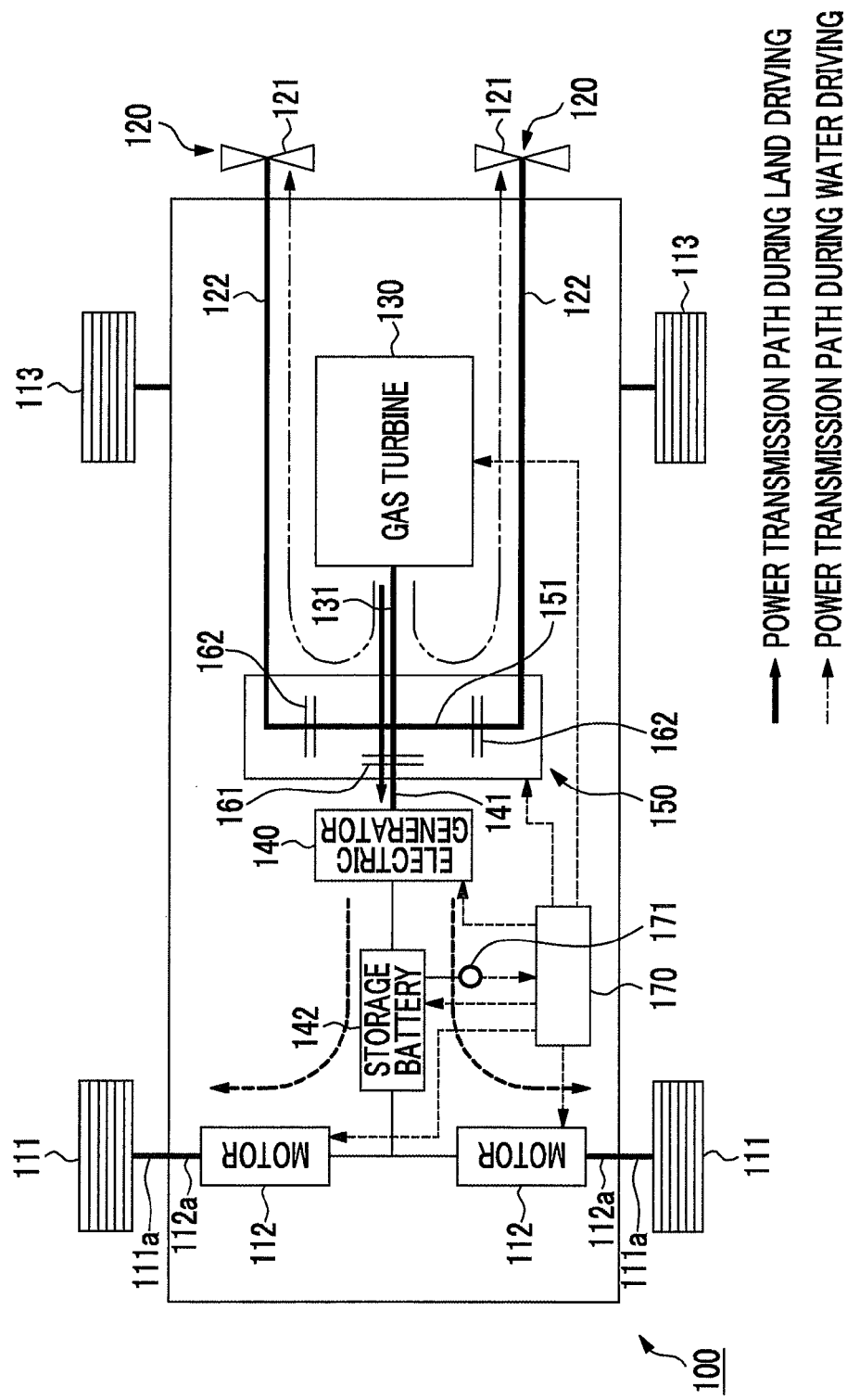
FIG. 1 is a schematic configuration diagram of a first embodiment of an amphibious vehicle according to the present invention.

As shown in FIG. 1, an amphibious vehicle 100 according to the present embodiment can perform land travelling in which the vehicle travels on land by front wheels 111 and rear wheels 113 mounted on the amphibious vehicle 100, water sailing in which the vehicle sails on water by water propellers 120 mounted on the amphibious vehicle 100, and waterfront travelling in which the vehicle travels on a waterfront by the front wheels 111, the rear wheels 113, and the water propellers 120.

An axle 111a of each of the front wheels 111 is connected to an output shaft 112a of a motor 112. Accordingly, the front wheels 111 are rotated and driven by the motors 112. The motors 112 are connected to a storage battery 142 connected to an electric generator 140. That is, the storage battery 142 can charge and discharge electric power which is produced by the electric generator 140. Accordingly, when the electric power is supplied from the storage battery 142 to the motors 112, the output shafts 112a of the motors 112 are rotated and driven, and the front wheels 111 are rotated and driven by rotating of the output shafts 112a of the motors 112.

Each of the water propellers 120 includes a propeller 121, and a propeller shaft 122 which is mounted on the propeller 121. The propeller shafts 122 are rotated, the propellers 121 are rotated, and thus, the amphibious vehicle 100 obtains a propelling force of the amphibious vehicle 100.

The amphibious vehicle 100 includes a gas turbine 130 which is a drive source (engine) and in which an output shaft 131 is rotated and driven by supply of a fuel such as a diesel fuel, and includes a power distribution device 150 which distributes and transmits rotary movement of the output shaft 131 into an input shaft 141 side of the electric generator 140, and the propeller shafts 122 sides of the water propellers 120 via a power distribution shaft 151 or the like.

A first clutch 161 is provided on the input shaft 141 of the electric generator 140, and the first clutch intermittently transmits the rotary movement of the output shaft 131 from the output shaft 131 to the input shaft 141 of the electric generator 140. Second clutches 162 are provided on the power distribution shaft 151 of the power distribution device 150, and the second clutches intermittently transmit the rotary movement of the output shaft 131 to the propeller shafts 122 via the power distribution shafts 151 of the power distribution device 150 or the like.

In addition, the amphibious vehicle 100 includes a control apparatus 170 which configures control means for controlling the motors 112, the gas turbine 130, the electric generator 140, the first clutch 161, the second clutches 162, the storage battery 142, or the like. A storage amount detector 171 which detects the storage amount of the storage battery 142 is connected to an input side of the control apparatus 170.

In the present embodiment, the water propellers 120 or the like configure water propelling means, and the storage amount detector 171 or the like configures storage amount detection means.

Next, an operation of the amphibious vehicle 100 by the control apparatus 170 included in the above-described amphibious vehicle 100 will be described.

First, when the amphibious vehicle sails on water, the control apparatus 170 controls the second clutches 162 so that the power distribution shaft 151 and the propeller shafts 122 are connected to each other while controlling the first clutch 161 so that the output shaft 131 of the gas turbine 130 and the input shaft 141 of the electric generator 140 are disconnected from each other, controls the gas turbine 130 so that the gas turbine 130 is driven at a high load ratio, for example, a load ratio of 100%, and transmits the rotary movement of the output shaft 131 of the gas turbine 130 to the propeller shafts 122 via the power distribution shaft 151, the second clutches 162, or the like. Accordingly, the propeller shafts 122 are rotated and driven, the propellers 121 are rotated, and thus, the amphibious vehicle 100 obtains a propelling force during the water sailing.

When the amphibious vehicle travels on land, the control apparatus 170 supplies electric power from the storage battery 142 to the motors 112. Accordingly, the output shafts 112a of the motors 112 are rotated and driven, the front wheels 111 are rotated, and thus, the amphibious vehicle 100 obtains a propelling force (travelling force) during land travelling.

In addition, when the amphibious vehicle travels on land, in a case where it is determined that the storage amount (detected value) detected by the storage amount detector 171 is larger than an upper limit set value, the control apparatus 170 controls the gas turbine 130 so that the driving of the gas turbine 130 stops. On the other hand, in a case where it is determined that the storage amount (detected value) detected by the storage amount detector 171 is smaller than a lower limit set value which is smaller than the upper limit set value, the control apparatus 170 controls the first clutch 161 so that the output shaft 131 of the gas turbine 130 and the input shaft 141 of the electric generator 140 are connected to each other while controlling the second clutches 162 so that the power distribution shaft 151 and the propeller shafts 122 are disconnected from each other, controls the gas turbine 130 so that the gas turbine 130 is driven at a low fuel economy ratio, for example, a load ratio of 100%, transmits the rotary movement of the output shaft 131 of the gas turbine 130 to the electric generator 140, and charges the storage battery 142 with the electric power produced by the electric generator 140. Accordingly, even when the storage battery 142 is charged with the electric power, it is possible to suppress the deterioration of the fuel economy ratio due to the gas turbine 130 being driven at a low load ratio.

Therefore, according to the amphibious vehicle 100 of the present embodiment, without it being necessary to drive the gas turbine 130 at the low load ratio and drive the front wheels 111 or the like by the gas turbine 130, electric power is supplied from the storage battery 142 to the motors 112 and the front wheels 111 are rotated and driven by the motors 112, and the vehicle can travel on land. Accordingly, it is possible to suppress the deterioration of the fuel economy ratio due to the gas turbine 130 being driven at the low load ratio.

Second Embodiment

A second embodiment of the amphibious vehicle according to the present invention will be described with reference to FIG. 2. In addition, the reference numerals similar to those used in the above-described first embodiment are used with respect to those similar to the above-described first embodiment, and descriptions overlapping with the above-described first embodiment will be omitted.

Figure 2:
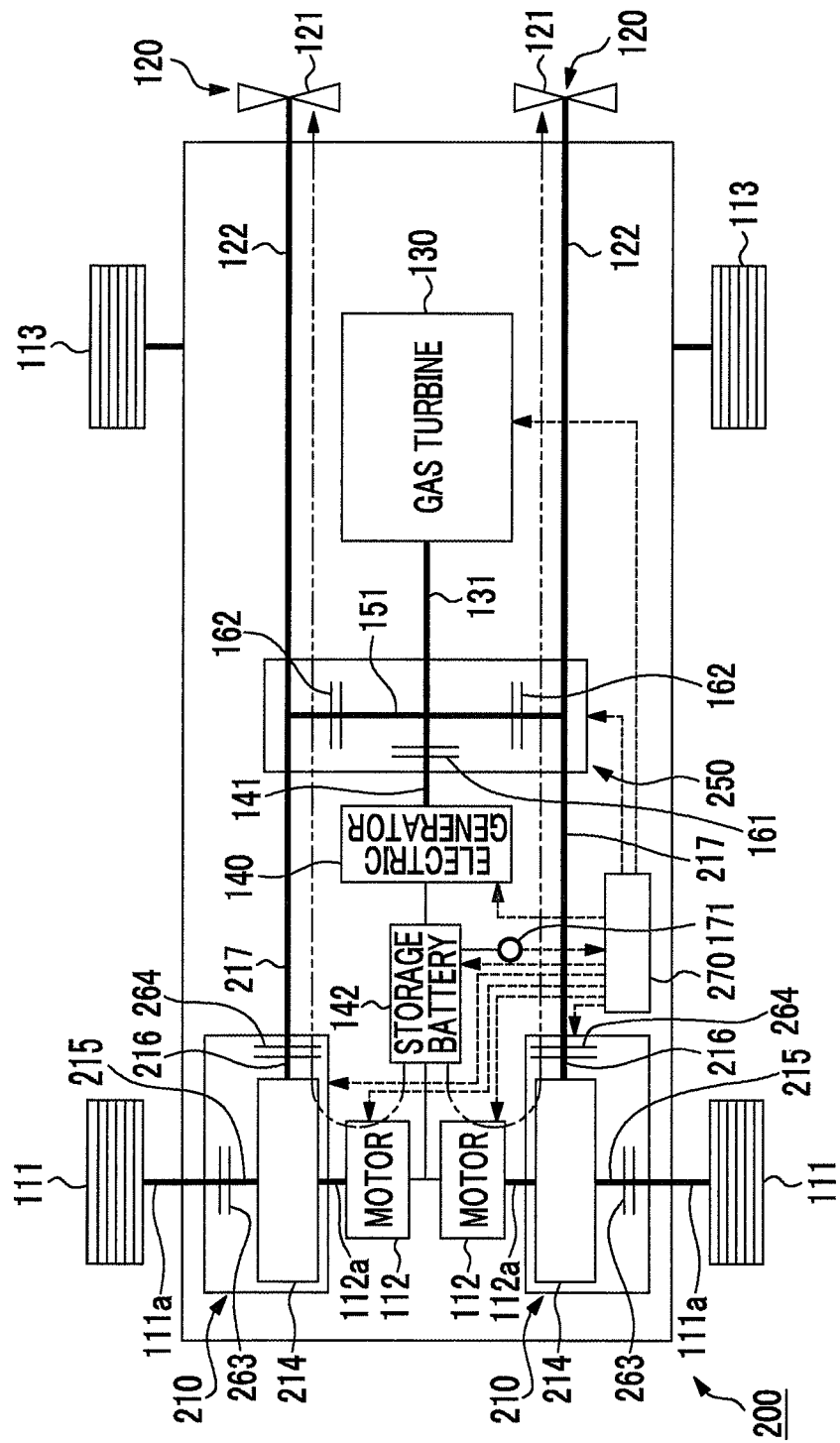
FIG. 2 is a schematic configuration diagram of a second embodiment of the amphibious vehicle according to the present invention.

As shown in FIG. 2, an amphibious vehicle 200 according to the present embodiment includes a motor output distribution transmission device 210 which distributes and transmits the output of each of the motors 112 to the front wheel 111 side and the water propeller 120 side. The motor output distribution transmission device 210 is provided so as to be connected to the output shaft 112a of the motor 112, and includes a motor output distribution device 214 which has a gear (not shown) which distributes the rotary movement of the output shaft 112a of the motor 112 into the front wheel 111 side and the water propeller 120 side.

The motor output distribution transmission device 210 includes a front wheel side motor output transmission shaft 215 which transmits the rotary movement of the output shaft 112a of the motor 112 to the front wheel 111 side, and a water propeller side motor output transmission shaft 216 which transmits the rotary movement of the output shaft 112a of the motor 112 to the propeller shaft 122 side.

The front wheel side motor output transmission shaft 215 and the axle 111a of the front wheel 111 are connected to each other via a third clutch 263. Accordingly, the output which is distributed to the front wheel 111 side by the motor output distribution device 214, that is, the rotary movement of the output shaft 112a is intermittently transmitted to the front wheel 111 via the front wheel side motor output transmission shaft 215, the axle 111a, and the like by the third clutch 263.

The water propeller side motor output transmission shaft 216 and the connection shaft 217 are connected to each other via a fourth clutch 264. The connection shaft 217 is connected to the propeller shaft 122. Accordingly, the output which is distributed to the water propeller 120 side by the motor output distribution device 214, that is, the rotary movement of the output shaft 112a is intermittently transmitted to the propeller shaft 122 via the water propeller side motor output transmission shaft 216, the connection shaft 217, and the like by the fourth clutch 264.

The amphibious vehicle 200 includes a control apparatus 270 which configures control means for controlling the motor output distribution transmission device 210, that is, the motor output distribution devices 214, the third clutches 263, the fourth clutches 264, or the like in addition to the motors 112, the gas turbine 130, the electric generator 140, the first clutch 161, the second clutches 162, and the storage battery 142. In addition, the storage amount detector 171 which detects the storage amount of the storage battery 142 is connected to the input side of the control apparatus 270.

In this way, in the present embodiment, the motor output distribution transmission devices 210 (the motor output distribution devices 214, the front wheel side motor output transmission shafts 215, the propeller side motor output transmission shafts 216, the connection shafts 217, the third clutches 263, and the fourth clutches 264) or the like configure motor output distribution transmission means, the motor output distribution devices 214 or the like configure motor output distribution means, the front wheel side motor output transmission shafts 215 or the like configure wheel side motor output transmission means, and the propeller side motor output transmission shafts 216, the connection shafts 217, or the like configure water propelling means side motor output transmission means.

Next, an operation of the amphibious vehicle 200 by the control apparatus 270 included in the above-described amphibious vehicle 200 will be described.

First, when amphibious vehicle performs high speed sailing on water or performs sailing in which an immediate response is required, that is, when a large output is required, the control apparatus 270 controls the first clutch 161 so that the output shaft 131 of the gas turbine 130 and the input shaft 141 of the electric generator 140 are disconnected from each other, controls the second clutches 162 so that the power distribution shaft 151 and the propeller shafts 122 are connected to each other while controlling the fourth clutches 264 so that the water propeller side motor output transmission shafts 216 and the connection shafts 217 are disconnected from each other, controls the gas turbine 130 so that the gas turbine 130 is driven at a high load ratio, for example, a load ratio of 100%, and transmits the rotary movement of the output shaft 131 of the gas turbine 130 to the propeller shafts 122 via the power distribution shaft 151 the second clutches 162, and the like. Accordingly, the propeller shafts 122 are rotated and driven, the propellers 121 are rotated, and thus, the amphibious vehicle 200 obtains a propelling force which is required when the vehicle performs high speed sailing on water in which a large output is required or sailing in which an immediate response is required.

When the amphibious vehicle sails on water at a low speed, that is, when a large output is not required, the control apparatus 270 controls the second clutches 162 so that the power distribution shaft 151 and the propeller shafts 122 are disconnected from each other, controls the fourth clutches 264 so that the water propeller side motor output transmission shafts 216 and the connection shafts 217 are connected to each other while controlling the third clutches 263 so that the front wheel side motor output transmission shafts 215 and axles 111a of the front wheels 111 are disconnected from each other, supplies the electric power from the storage battery 142 to the motors 112, rotates and drives the output shafts 112a of the motors 112, and transmits the rotary movements of the output shafts 112a of the motors 112 to the propeller shafts 122 via the motor output distribution devices 214, the water propeller side motor output transmission shafts 216, the fourth clutches 264, the connection shafts 217, and the like. Accordingly, the propeller shafts 122 are rotated and driven, the propellers 121 are rotated, and thus, the amphibious vehicle 200 obtains a propelling force which is required when the vehicle sails at a low speed on water in which a large output is not required.

When the amphibious vehicle travels on a waterfront, the control apparatus 270 controls the third clutches 263 so that the front wheel side motor output transmission shafts 215 and the axles 111a of the front wheels 111 are connected to each other while controlling the second clutch 162 so that the power distribution shaft 151 and the propeller shafts 122 are disconnected from each other, controls the fourth clutches 264 so that the water propeller side motor output transmission shafts 216 and the connection shafts 217 are connected to each other, supplies the electric power from the storage battery 142 to the motors 112, rotates and drives the output shafts 112a of the motors 112, transmits the rotary movements of the output shafts 112a of the motors 112 to the front wheels 111 via the motor output distribution devices 214, the front wheel side motor output transmission shafts 215, the third clutches 263, and the like, and transmits the rotary movements to the propeller shafts 122 via the motor output distribution devices 214, the water propeller side motor output transmission shafts 216, the fourth clutches 264, and the connection shafts 217. Accordingly, the front wheels 111 are rotated and driven, the propellers 121 are rotated by the rotation and driving of the propeller shafts 122, and thus, the amphibious vehicle 200 obtains a propelling force which is required when the vehicle travels on a waterfront in which a large output is not required.

When the amphibious vehicle travels on land, the control apparatus 270 controls the third clutches 263 so that the front wheel side motor output transmission shafts 215 and the axles 111a of the front wheels 111 are connected to each other while controlling the fourth clutches 264 so that the water propeller side motor output transmission shafts 216 and the connection shafts 217 are disconnected from each other, and supplies the electric power from the storage battery 142 to the motors 112. Accordingly, the output shafts 112a of the motors 112 are rotated and driven, the rotations are transmitted to the front wheels 111 via the motor output distribution devices 214, the front wheel side motor output transmission shafts 215, the axles 111a, and the like, the front wheels 111 are rotated, and thus, the amphibious vehicle 200 obtains a propelling force (travelling force) during the land travelling.

When the amphibious vehicle sails at a low speed on water, travels on land, or travels on a waterfront, in a case where it is determined that the storage amount (detected value) detected by the storage amount detector 171 is larger than the upper limit set value, the control apparatus 270 controls the gas turbine 130 so that the driving of the gas turbine 130 stops. On the other hand, in a case where it is determined that the storage amount (detected value) detected by the storage amount detector 171 is smaller than the lower limit set value which is smaller than the upper limit set value, the control apparatus 270 controls the first clutch 161 so that the output shaft 131 of the gas turbine 130 and the input shaft 141 of the electric generator 140 are connected to each other while controlling the second clutches 162 so that the power distribution shaft 151 and the propeller shafts 122 are disconnected from each other, controls the gas turbine 130 so that the gas turbine 130 is driven at a low fuel economy ratio, for example, a load ratio of 100%, transmits the rotary movement of the output shaft 131 of the gas turbine 130 to the electric generator 140, and charges the storage battery 142 with the electric power produced by the electric generator 140. Accordingly, even when the storage battery 142 is charged with the electric power, it is possible to suppress the deterioration of the fuel economy ratio due to the gas turbine 130 being driven at a low load ratio.

Therefore, according to the amphibious vehicle 200 of the present embodiment, in addition to the same effects as the amphibious vehicle 100 according to the above-described first embodiment, since the electric power is supplied from the storage battery 142 to motors 112 and the water propellers 120 are driven by the motors 112, the amphibious vehicle can sail on water at a low speed, and accordingly, it is possible to suppress the deterioration of the fuel economy ratio due to the gas turbine 130 being driven at the low load ratio.

Third Embodiment

A third embodiment of the amphibious vehicle according to the present invention will be described with reference to FIG. 3. In addition, the reference numerals similar to those used in the above-described first and second embodiments are used with respect to those similar to the above-described first and second embodiments, and descriptions overlapping with the above-described first and second embodiments will be omitted.

Figure 3:
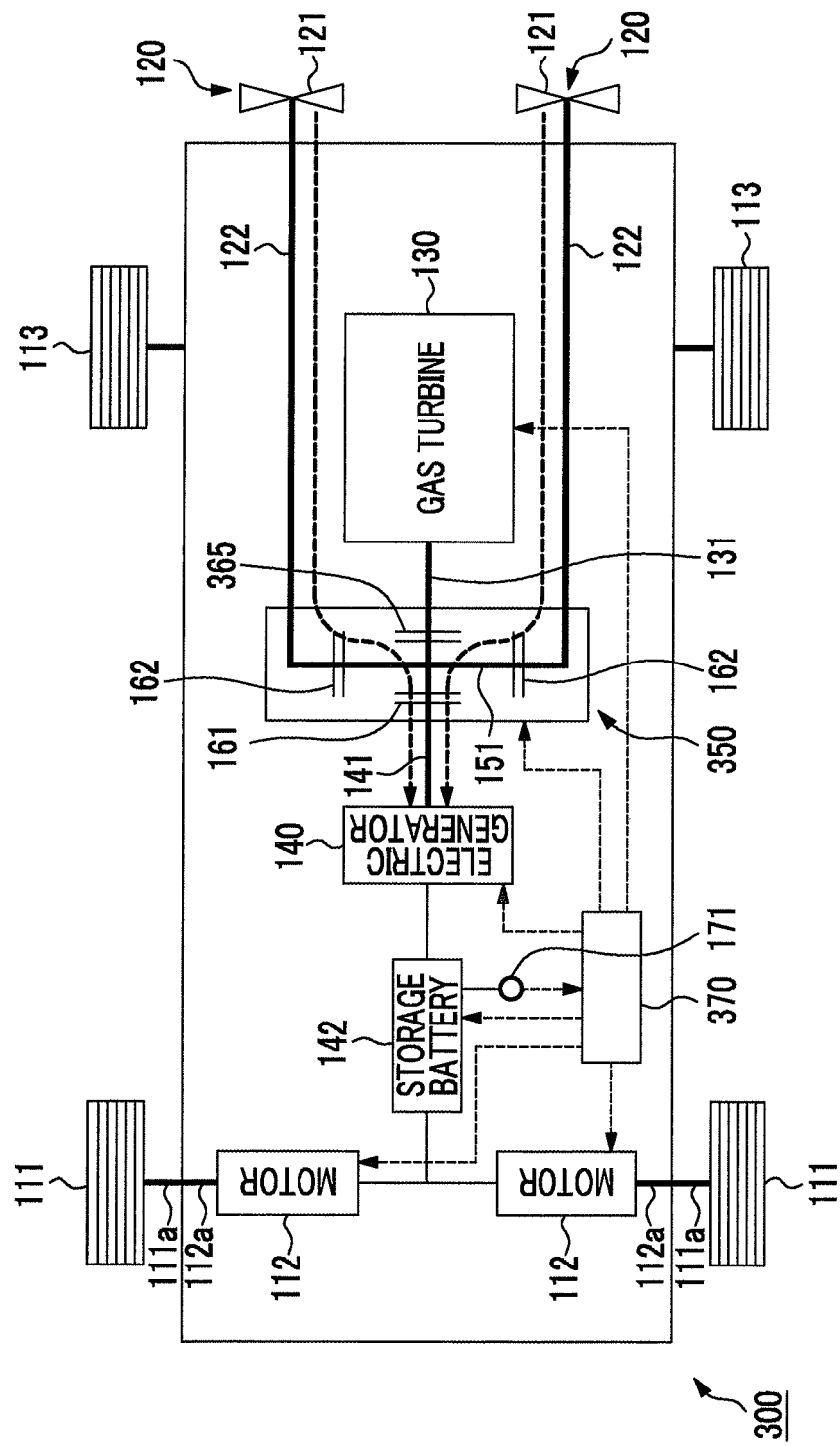
FIG. 3 is a schematic configuration diagram of a third embodiment of the amphibious vehicle according to the present invention.
Figure 4:
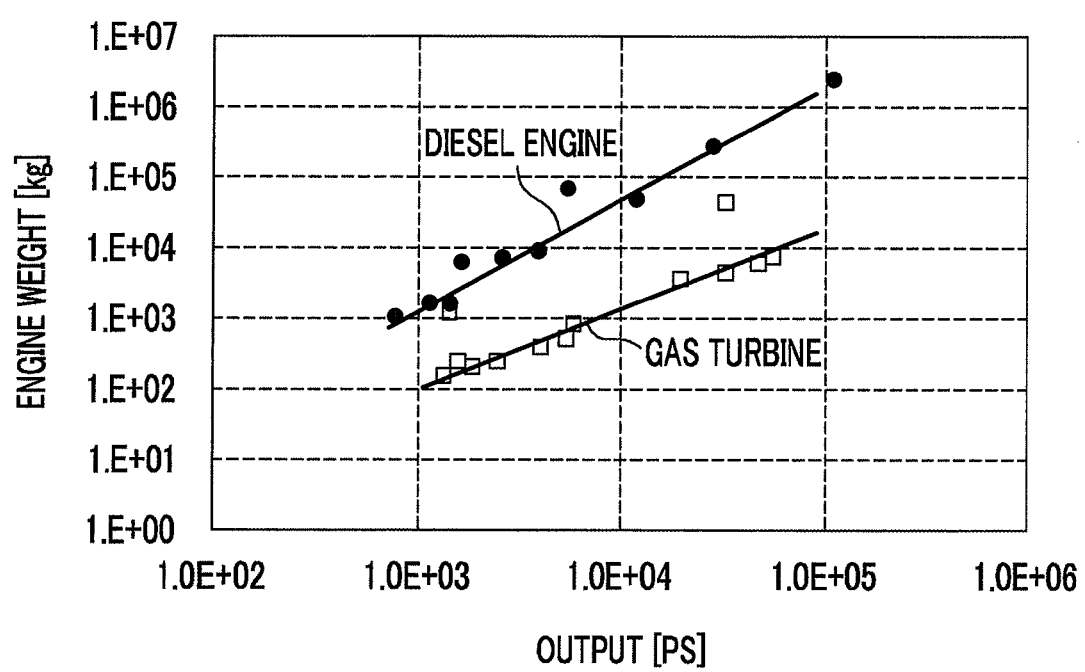
FIG. 4 is a graph showing a relationship between output and engine weight in a gas turbine and a diesel engine.
Figure 5:
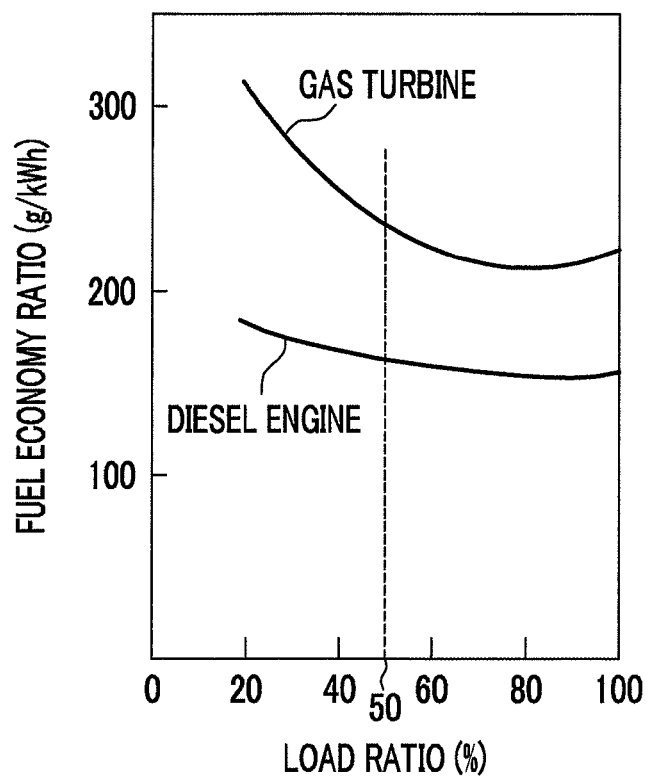
FIG. 5 is a graph showing a relationship between a load ratio and a fuel economy ratio in the gas turbine and the diesel engine.
Figure 6:
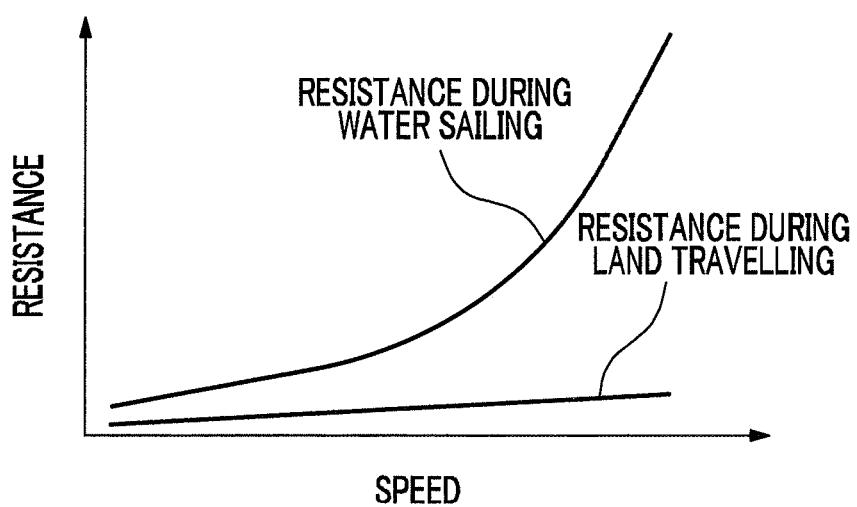
FIG. 6 is a graph showing a relationship between speed and resistance during water sailing and land travelling of the amphibious vehicle.

In the amphibious vehicle 300 according to the present embodiment, as shown in FIG. 3, a fifth clutch 365 is provided on the output shaft 131 of the gas turbine 130, and the rotary movement of the output shaft 131 of the gas turbine 130 is intermittently transmitted to the input shaft 141 of the electric generator 140 and the power distribution shaft 151 by the fifth clutch 365.

The amphibious vehicle 300 includes a control apparatus 370 which configures control means for controlling the fifth clutch 365 or the like in addition to the motors 112, the gas turbine 130, the electric generator 140, the first clutch 161, the second clutches 162, and the storage battery 142. In addition, the storage amount detector 171 which detects the storage amount of the storage battery 142 is connected to the input side of the control apparatus 370.

Next, an operation of the amphibious vehicle 300 by the control apparatus 370 included in the above-described amphibious vehicle 300 will be described.

When the amphibious vehicle travels on land, the control apparatus 370 supplies the electric power from the storage battery 142 to the motors 112. Accordingly, the output shafts 112a of the motors 112 are rotated and driven, the front wheels 111 are rotated, and thus, the amphibious vehicle 300 obtains a propelling force (travelling force) during the land travelling.

In addition, when the amphibious vehicle travels on land, in a case where it is determined that the storage amount (detected value) detected by the storage amount detector 171 is larger than the upper limit set value, the control apparatus 370 controls the gas turbine 130 so that the driving of the gas turbine 130 stops. On the other hand, in a case where it is determined that the storage amount (detected value) detected by the storage amount detector 171 is smaller than the lower limit set value which is smaller than the upper limit set value, the control apparatus 370 controls the first clutch 161 and the fifth clutch 365 so that the output shaft 131 of the gas turbine 130 and the input shaft 141 of the electric generator 140 are connected to each other while controlling the second clutches 162 so that the power distribution shaft 151 and the propeller shafts 122 are disconnected from each other, controls the gas turbine 130 so that the gas turbine 130 is driven at a low fuel economy ratio, for example, a load ratio of 100%, transmits the rotary movement of the output shaft 131 of the gas turbine 130 to the electric generator 140, and charges the storage battery 142 with the electric power produced by the electric generator 140. Accordingly, even when the storage battery 142 is charged with the electric power, it is possible to suppress the deterioration of the fuel economy ratio due to the gas turbine 130 being driven at a low load ratio.

When the amphibious vehicle sails on water, the control apparatus 370 controls the fifth clutch 365 so that the output shaft 131 of the gas turbine 130 and the power distribution shaft 151 are connected to each other while controlling the first clutch 161 so that the output shaft 131 of the gas turbine 130 and the input shaft 141 of the electric generator 140 are disconnected from each other, controls the second clutches 162 so that the power distribution shaft 151 and the propeller shaft 122 are connected to each other, controls the gas turbine 130 so that the gas turbine 130 is driven at a high load ratio, for example, a load ratio of 100%, and transmits the rotary movement of the output shaft 131 of the gas turbine 130 to the propeller shafts 122 via the power distribution shaft 151 the second clutches 162, and the like. Accordingly, the propeller shafts 122 are rotated and driven, the propellers 121 are rotated, and thus, the amphibious vehicle 300 obtains a propelling force during the water sailing.

In addition, when the amphibious vehicle sails on water, in a case where the operation for stopping the water propeller 120 is performed, the control apparatus 370 controls the second clutches 162 so that the propeller shafts 122 and the power distribution shaft 151 are connected to each other while controlling the fifth clutch 365 so that the output shaft 131 of the gas turbine 130, the input shaft 141 of the electric generator 140, and the power distribution shaft 151 are disconnected from one another, controls the first clutch 161 so that the input shaft 141 of the electric generator 140 and the power distribution shaft 151 are connected to each other, transmits the rotary movements of the propellers 121 to the input shaft 141 of the electric generator 140 via the propeller shaft 122 and the power distribution shaft 151, produces the electric power in the electric generator 140 by the rotating of the input shaft 141, and charges the storage battery 142 with the electric power.

Therefore, according to the amphibious vehicle 300 of the present embodiment, in addition to the same effects as the amphibious vehicle 100 according to the above-described first embodiment, since recovery energy using the electric generator 140 is produced by the rotary movements of the propellers 121 and the storage battery 142 can be charged with the recovery energy even when the operation which stops the water propellers 120 is performed during the water sailing, it is possible to suppress the deterioration of the fuel economy ratio.

Other Embodiments

Moreover, in the above, the amphibious vehicles 100, 200, and 300 which have the gas turbine 130 as the drive source are described. However, instead of the gas turbine 130, an amphibious vehicle which includes an engine such as a gasoline engine or a diesel engine may be adopted. According to the amphibious vehicle, compared to the gas turbine 130, in the gasoline engine or the diesel engine, the difference between the fuel economy ratio during a low load and the fuel economy ratio during a high load is smaller. Accordingly, compared to the above-described amphibious vehicles 100, 200, and 300, even when the effects which suppress the deterioration of the fuel economy ratio are smaller, it is possible to suppress the deterioration of the fuel economy ratio due to the gasoline engine and the diesel engine being driven by a low load ratio.

In the above, the amphibious vehicles 100, 200, and 300 including two motors 112 are described. However, an amphibious vehicle in which the front wheels 111 and 111 are rotated and driven by one motor, the rear wheels 113 and 113 are rotated and driven by one or two motors, or each of the front wheels 111 and 111 and the rear wheels 113 and 113 are rotated and driven by a motor may be adopted.

An amphibious vehicle in which the amphibious vehicle 200 according to the second embodiment and the amphibious vehicle 300 according to the third embodiment are configured to be combined may be adopted. Also in this amphibious vehicle, the same effects as the above-described vehicles 200 and 300 are exerted.

INDUSTRIAL APPLICABILITY

According to the amphibious vehicle of the present invention, it is possible to suppress deterioration of a fuel economy ratio due to driving of a low load ratio, and thus, the amphibious vehicle can be very beneficially used.

REFERENCE SIGNS LIST

100: amphibious vehicle
111: front wheel
112: motor
113: rear wheel
120: water propeller
121: propeller
122: propeller shaft
130: gas turbine
131: output shaft
140: electric generator
141: input shaft
142: storage battery
150: power distribution device
151: power distribution shaft
161: first clutch
162: second clutch
170: control apparatus
171: storage amount detector
200: amphibious vehicle
210: motor output distribution transmission device
214: motor output distribution device
215: front wheel side motor output transmission shaft
216: water propeller side motor output transmission shaft
217: connection shaft
250: power distribution device
263: third clutch
264: fourth clutch
270: control apparatus
300: amphibious vehicle
350: power distribution device
365: fifth clutch
370: control apparatus

The invention claimed is:

1. An amphibious vehicle capable of performing land travelling in which the vehicle travels on land, water sailing in which the vehicle sails on water, and waterfront travelling in which the vehicle travels on a waterfront, comprising:
an engine;
an electric generator to which output from the engine is transmitted via a first clutch;
a storage battery that is charged with or discharges electric power produced by the electric generator;
a motor rotated and driven by electric power supplied from the storage battery;
a wheel rotated and driven by rotation and driving of the motor; and
control means for controlling the engine, the first clutch, the electric generator, the storage battery, and the motor,
wherein when the vehicle travels on land, the control means causes electric power to be supplied from the storage battery to the motor so that the wheel is rotated and driven by the motor,
the amphibious vehicle further comprising:
water propelling means to which the output from the engine is transmitted via a second clutch; and
motor output distribution transmission means for distributing and transmitting the output from the motor to the wheel side and the water propelling means side,
wherein the motor output distribution transmission means includes: motor output distribution means for distributing the output from the motor to the wheel side and the water propelling means side; wheel side motor output transmission means for transmitting the output from the motor distributed by the motor output distribution means to the wheel side via a third clutch; and water propelling means side motor output transmission means for transmitting the output from the motor distributed by the motor output distribution means to the water propelling means side via a fourth clutch,
wherein the control means also controls the second clutch, the third clutch, and the fourth clutch, and
wherein when the vehicle sails on water at a low speed, the control means controls the second clutch so that the engine and the water propelling means are disconnected from each other, controls the fourth clutch so that the water propelling means side motor output transmission means and the water propelling means are connected to each other while controlling the third clutch so that the wheel side motor output transmission means and the wheel are disconnected from each other, and supplies the electric power from the storage battery to the motor and drives the water propelling means by the motor.

2. The amphibious vehicle according to claim 1, further comprising:
storage amount detection means for detecting a storage amount of the storage battery,
wherein when the vehicle travels on a waterfront, the control means controls the engine so that the engine stops in a case where the storage amount detected by the storage amount detection means is larger than an upper limit set value, and
wherein in a case where the storage amount detected by the storage amount detection means is smaller than a lower limit set value, the control means controls the first clutch so that the engine and the electric generator are connected to each other while controlling the second clutch so that the engine and the water propelling means are disconnected from each other, controls the engine so that the engine is driven at a high load ratio, and transmits the output from the engine to the electric generator and charges the storage battery with the electric power produced by the electric generator.

3. The amphibious vehicle according to claim 2, wherein the engine is a gas turbine.

4. The amphibious vehicle according to claim 1, wherein the engine is a gas turbine.

5. An amphibious vehicle capable of performing land travelling in which the vehicle travels on land, water sailing in which the vehicle sails on water, and waterfront travelling in which the vehicle travels on a waterfront, comprising:
an engine;
an electric generator to which output from the engine is transmitted via a first clutch;
a storage battery that is charged with or discharges electric power produced by the electric generator;
a motor rotated and driven by electric power supplied from the storage battery;
a wheel rotated and driven by rotation and driving of the motor; and
control means for controlling the engine, the first clutch, the electric generator, the storage battery, and the motor,
wherein when the vehicle travels on land, the control means causes electric power to be supplied from the storage battery to the motor so that the wheel is rotated and driven by the motor,
the amphibious vehicle further comprising:
water propelling means to which the output from the engine is transmitted via a second clutch; and
motor output distribution transmission means for distributing and transmitting the output from the motor to the wheel side and the water propelling means side,
wherein the motor output distribution transmission means includes: motor output distribution means for distributing the output from the motor to the wheel side and the water propelling means side; wheel side motor output transmission means for transmitting the output from the motor distributed by the motor output distribution means to the wheel side via a third clutch; and water propelling means side motor output transmission means for transmitting the output from the motor distributed by the motor output distribution means to the water propelling means side via a fourth clutch,
wherein the control means also controls the second clutch, the third clutch, and the fourth clutch, and
wherein when the vehicle travels on a waterfront, the control means controls the third clutch so that the wheel side motor output transmission means and the wheel are connected to each other while controlling the second clutch so that the engine and the water propelling means are disconnected from each other, controls the fourth clutch so that the water propelling means side motor output transmission means and the water propelling means are connected to each other, and supplies the electric power from the storage battery to the motor and drives the wheel and the water propelling means by the motor.

6. The amphibious vehicle according to claim 5, wherein the engine is a gas turbine.

7. An amphibious vehicle capable of performing land travelling in which the vehicle travels on land, water sailing in which the vehicle sails on water, and waterfront travelling in which the vehicle travels on a waterfront, comprising:
an engine;
an electric generator to which output from the engine is transmitted via a first clutch;
a storage battery that is charged with or discharges electric power produced by the electric generator;
a motor rotated and driven by electric power supplied from the storage battery;
a wheel rotated and driven by rotation and driving of the motor; and
control means for controlling the engine, the first clutch, the electric generator, the storage battery, and the motor,
wherein when the vehicle travels on land, the control means causes electric power to be supplied from the storage battery to the motor so that the wheel is rotated and driven by the motor,
the amphibious vehicle further comprising:
water propelling means to which the output from the engine is transmitted via a second clutch; and
storage amount detection means for detecting a storage amount of the storage battery,
wherein the control means also controls the second clutch, and when the vehicle travels on land or sails on water at a low speed,
the control means controls the engine so that the engine stops in a case where the storage amount detected by the storage amount detection means is larger than an upper limit set value, and
wherein in a case where the storage amount detected by the storage amount detection means is smaller than a lower limit set value, the control means controls the first clutch so that the engine and the electric generator are connected to each other while controlling the second clutch so that the engine and the water propelling means are disconnected from each other, controls the engine so that the engine is driven at a high load ratio, and transmits the output from the engine to the electric generator and charges the storage battery with the electric power produced by the electric generator.

8. The amphibious vehicle according to claim 7, wherein the engine is a gas turbine.

9. An amphibious vehicle capable of performing land travelling in which the vehicle travels on land, water sailing in which the vehicle sails on water, and waterfront travelling in which the vehicle travels on a waterfront, comprising:
an engine;
an electric generator to which output from the engine is transmitted via a first clutch;
a storage battery that is charged with or discharges electric power produced by the electric generator;
a motor rotated and driven by electric power supplied from the storage battery;
a wheel rotated and driven by rotation and driving of the motor; and control means for controlling the engine, the first clutch, the electric generator, the storage battery, and the motor, wherein when the vehicle travels on land, the control means causes electric power to be supplied from the storage battery to the motor so that the wheel is rotated and driven by the motor, the amphibious vehicle further comprising:

water propelling means to which the output from the engine is transmitted via a second clutch; and a fifth clutch which performs connection between the engine, and the electric generator and the water propelling means, wherein the control means also controls the second clutch and the fifth clutch, and wherein when an operation which stops the driving of the water propelling means is performed in a case where the vehicle sails on water, the control means controls the fifth clutch so that the engine, and the water propelling means and the electric generator are disconnected from each other, controls the first clutch and the second clutch so that the water propelling means and the electric generator are connected to each other, transmits a rotary movement of the water propelling means generated by the water sailing to the electric generator, and charges the storage battery with the electric power produced by the electric generator.

10. The amphibious vehicle according to claim 9, wherein the engine is a gas turbine.

* * * * *